Sept. 13, 1960  F. L. LONG ET AL  2,952,551
METHOD OF MAKING A PACKAGED FROZEN EGG PRODUCT
Filed July 18, 1955

Francis L. Long
Donald E. Long
INVENTORS

BY

United States Patent Office 2,952,551
Patented Sept. 13, 1960

2,952,551

METHOD OF MAKING A PACKAGED FROZEN EGG PRODUCT

Francis L. Long, 1412 Locust St., and Donald E. Long, 1314 7th Ave., both of Sterling, Ill.

Filed July 18, 1955, Ser. No. 522,417

3 Claims. (Cl. 99—196)

Our present invention relates broadly to frozen food article, and method of making and using same; and more particularly to a frozen food article containing both the whites and the yolks of eggs thoroughly mixed together and frozen for preservation and for convenient slicing into single service portions (articles) which are held in shape while being cooked by a circle of the wall material of a container in which the article is frozen.

In the culinary art of cooking the present steps involved in preparing certain foods employing eggs as the predominant ingredient, require the use of several different culinary articles such as bowls, beater, slicing knives, condiments and other ingredients according to the taste desired in the food. The several possibilities for different cooked egg food articles may call for several ingredients and many steps of preparation and involve additional dish and utensil washing. In addition the article when put into the cooking pan may be of such inherent consistency as to be difficult to cook in a size and thickness of the finally cooked article so as to require a large number of different sized pans or cause an unsatisfactorily shaped and cooked end article. Some such articles cannot be cooked in large pans or on griddles at all because of their inherent tendency to spread out substantially into an excessively large and thin end article which fails to obtain the proper taste due to too rapid cooking of some ingredients and insufficient cooking of other ingredients. In addition to the above, errors are made frequently by inexperienced cooks in several ways. For example, too much or too little of certain ingredients can seriously alter the delicate natural flavor of fresh eggs to such an extent that the finished article will either be overly seasoned or lack savor. Another common error is caused by mixing either too much or too little, in toto, for a given sized cooking pan so that the finished article is too thick and either overdone on the outer surfaces or underdone in the center; or too thin with the results mentioned above in connection with griddle cooking.

Accordingly, it is a broad object of our invention to provide a frozen premixed egg food article having seasoning and/or other ingredients, and adapted to be both thawed and cooked in one continuous cooking operation, whereby to obtain substantially uniform cooked articles whether the cook is skilled or unskilled.

Another more specific object of the invention, in keeping with the above object, is to provide an improved omelet, denver sandwich filler, or similar article, in a single service size that may be used in a single thawing and cooking operation, whereby the time and labor attending the present methods of preparation of such articles is obviated.

Further objects and advantages of the invention reside in the methods of fabricating and/or using the article; and in the ingredients incorporated into same; and will either be obvious or pointed out in the following specification and claims.

Figure 1:
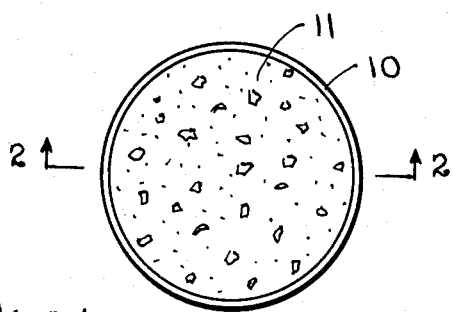
Figure 1 is a plan view of an article.
Figure 4:
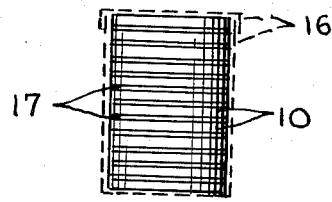
Figure 4 is a diagrammatic view of a package of twelve articles.
Figure 2:
Figure 2 is a sectional view taken on line 2—2 of Figure 1, and showing the article upon a griddle surface.
Figure 3:
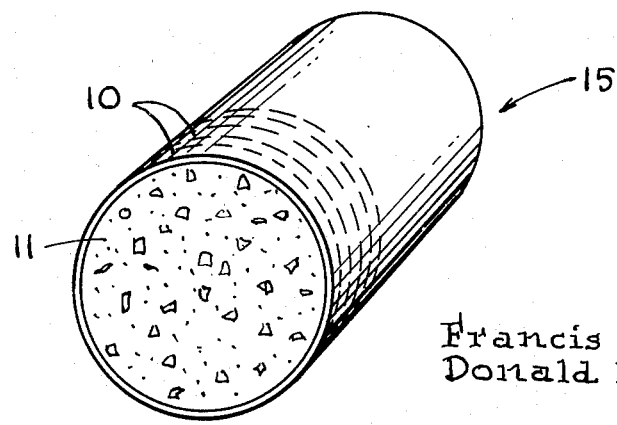
Figure 3 is a perspective view to illustrate a step in fabricating the article.

Referring more in detail to the drawing, and first to Figures 1 and 2, an article to be used as a filler for a denver sandwich is shown. This is a preferred form of the article because it is one that involves ingredients to be mentioned below that require careful selection and use to obtain the most desirable flavor and texture. We wish not to be limited to this article, however, because the article and technique involved can well be used in a wide variety of egg food articles that are cooked before consumption.

The filler for a denver sandwich is preferably made of whole mixed egg, precooked ham, onion, and usually one or more relishes such as pickle or pepper, etc. and condiments. When mixed in proper proportions, and properly cooked, this filler has a distinctive odor and flavor. Denver sandwiches are listed on menus of many restaurants and cafes. It is to be noted, however, that different cooks render substantial variations to this odor and flavor. The present invention insures uniformity of the article and, within limits prescribed in the instructions for use below, will obtain substantially the same desirable flavor and odor regardless of the skill of the cook.

For fabricating a batch of ingredients for the articles, the following proportions have been found to work satisfactorily (all percentages by weight). Of course, variations of amounts are permissible even out of the preferred ranges set forth, and can be modified as with milk, for example, or substitute ingredients.

| | Percent |
|---|---|
| Whole eggs | 80 to 95 |
| Other ingredients | 5 to 20 |
| Precooked ham | 2½ to 10 |
| Onion | 1 to 5 |
| Pickle (sweet, sour, dill, or sweet pickle) | 1 to 5 |
| Condiments: Salt, pepper, etc. | Trace to 0¼% |
| Flour | Trace to 0¼% |

Certain alternate, but not all combinations, may include items having color such as pimiento, for example, hot or red pepper, parsley, chives, etc., to suit certain tastes sometimes featured in certain restaurants which feature foods with nationality aspects, such as French, Spanish, Italian, Mexican, etc.

The article shown in Figures 1 and 2 comprises a ring 10 that can be of metal, paper or other suitable substance that will not deteriorate in use at the temperature at which the article is cooked. A solidly frozen mass 11 contains egg and other ingredients as set forth above. A surface of a heated griddle or pan is indicated at 12. A suitable portion of cooking oil or butter, etc., is placed upon the surface 12 (approximately one tablespoonful) and, when the same spreads over the surface to about the diameter of the article, the article is placed therein upon the surface. The mass 11 will quickly begin to thaw and cook. It has been found that even though the egg in the mass 11 must change in state from a frozen solid to a liquid to a cooked semi-porous solid that no appreciable leakage, if any, tends to occur around the bottom of the ring 10. The thawing-cooking process proceeds upward through the mass 11 (as viewed in Figure 2) and it appears that the coolness of the upper portion of the mass tends to conduct heat rapidly from the bottom of the mass to prevent undesirable scorching of the bottom, which is a common cause of untasty articles when cooked on a surface that is too hot. The frozen article cooks satisfactorily under conditions of heat that are not conducive to best results by present practice when using an unfrozen article, and this advantage is of significance. Frozen articles of various thicknesses (from ¼ to ½ inch, for example) cook satisfactorily. The thinner articles are most desirable for sandwiches and the thicker articles are preferred for servings such as scrambled egg or omelet, for example.

When the upper surface of the mass 11 has gone through the liquid state and begun to solidify, the entire mass may be turned over to brown the upper surface, if desired. This operation requires only a few seconds. When the article is cooked the ring 10 is peeled off and the article is ready for consumption.

It has been found that the entire operation takes less cooking time than the mixing and cooking by present practice, and that the cook need not stir the cooking mass to keep solids from settling to the bottom surface; which is a further significant advantage. In other words, the graduated thawing-cooking of the frozen article retains the solid ingredients such as ham, onion, pickle, etc., in place in the mass and obviates the conventional stirring operation presently used.

The process of making the article will now be described. Preferably fresh eggs are removed from the shells and yolks and whites are thoroughly mixed as by beating. The beating operation should be discontinued before the whites begin to thicken. The mixed eggs are placed in containers such as 15 of paper, the inside of which may be greased or waxed, if desired, to assure ready removal after the articles formed therein are cooked. The other ingredients (ham, onion, pickle, etc.) may be added immediately or after the mass has begun to cool and thicken. These other ingredients when used are preferable diced or cut up into small pieces and dusted with flour to increase the adherence of same in suspension in the egg mixture. When the mixture thickens sufficiently to suspend the solid ingredients in the mass, stirring can be discontinued. A visual indication may be made by observing when solids appear at the surface and stay there between oscillations of the stirrer. This phenomenon may be timed and thereafter the operation can be automatically timed.

The freezing process is preferably carried out at substantially minus twenty-five degrees Fahrenheit. When completely frozen, the shells may be stored at a temperature below freezing the same as ice cream and frozen foods, for example. Before packaging for use, however, the articles are sliced or sawed into suitably thick articles and can be boxed in a carton or box as indicated at 16 and be separated by paper 17 treated to prevent refreezing together to facilitate the use of individual articles.

The frozen articles can be cold stored for nine months to a year without appreciable deterioration of flavor or texture when cooked. This affords another significant advantage to manufacturer, merchant, and user, as a result of seasonal changes in productivity of chickens. Large quantities of articles can be manufactured when egg production and quality is high; at which time the cost of eggs is usually low. This will effect savings for those who make, vend, or use the articles, which further can be kept more uniform in quality throughout the year.

While we have shown and described in detail one modification of our invention, obviously other modifications in article and methods of making and using same will occur to those skilled in the art. For example, the article need not be round, as shown, but could be square or some other shape. Accordingly, we wish not to be limited in our invention only to the article and methods described but by the scope of the following claims.

We claim:

1. The method of making a frozen egg food article adapted for thawing and frying in one continuous operation, including the steps of, intimately mixing and chilling to thicken the whites and yolks of eggs, freezing the eggs in a carton, and slicing the carton and frozen eggs therein into a plurality of substantially flat sided relatively broad and thin articles, each of which is completely surrounded at its edges by a portion of the carton.

2. The method recited in claim 1 including the additional steps of, adding other edible ingredients to the eggs, and stirring the egg and ingredients while chilling same to such an extent that the ingredients become uniformly distributed as the eggs thicken due to chilling.

3. The method of making and using an egg food article, comprising the steps of, mixing the whites and yolks of eggs, freezing said eggs in a carton, slicing the carton and frozen eggs therein into serving portions in such manner that each portion is flat sided and completely surrounded on its edges by a portion of the carton, packaging at least one of the portions, transporting the packaged portion to a place of use, unpackaging the portion, and thawing and cooking same in one continuous operation.

References Cited in the file of this patent

UNITED STATES PATENTS

| | | |
|---|---|---|
| 1,864,285 | Taylor | June 21, 1932 |
| 1,955,484 | Birdseye | Apr. 17, 1934 |
| 2,364,049 | Bensel | Dec. 5, 1944 |
| 2,674,536 | Fisher | Apr. 6, 1954 |